United States Patent [19]
West

[11] Patent Number: 5,624,188
[45] Date of Patent: Apr. 29, 1997

[54] ACOUSTIC THERMOMETER

[76] Inventor: David A. West, 283 Whitewood Dr., Streamwood, Ill. 60107

[21] Appl. No.: 326,542

[22] Filed: Oct. 20, 1994

[51] Int. Cl.⁶ .............................. G01K 11/22; G01K 11/24
[52] U.S. Cl. ........................................ 374/119; 73/597
[58] Field of Search ............................. 374/119, 117; 73/632, 597; 364/557

[56] References Cited

U.S. PATENT DOCUMENTS

| | | |
|---|---|---|
| 3,514,747 | 5/1970 | Lynnworth et al. |
| 3,580,076 | 5/1971 | Mobsby . |
| 4,005,602 | 2/1977 | Wilkie .................................. 374/119 |
| 4,201,087 | 5/1980 | Akita et al. ........................... 374/119 |
| 4,848,924 | 7/1989 | Nuspl et al. .......................... 374/119 |
| 4,972,178 | 11/1990 | Suzuki .................................. 340/577 |
| 5,123,750 | 6/1992 | Ziegler et al. ........................ 374/117 |
| 5,286,109 | 2/1994 | Hanscombe et al. ................. 374/119 |
| 5,360,268 | 11/1994 | Hayashi et al. ...................... 374/119 |
| 5,437,506 | 8/1995 | Gray .................................... 374/119 |

FOREIGN PATENT DOCUMENTS

| | | | |
|---|---|---|---|
| 3031678 | 3/1982 | Germany | 374/119 |
| 0065351 | 5/1977 | Japan | 374/119 |
| 0097633 | 6/1983 | Japan | 374/119 |
| 0184525 | 10/1983 | Japan | 374/119 |
| 1084190 | 3/1989 | Japan | 374/119 |
| 1566231 | 5/1990 | U.S.S.R. | 374/119 |

*Primary Examiner*—Diego F. F. Gutierrez

[57] ABSTRACT

A thermometer using the temperature dependance of the speed of sound, measures the average temperature along a path traversing an open environment containing a medium. A transmitting transducer, coupled to a signal generator and placed at a first point in the medium, produces a burst of sound of predetermined frequency and duration. The sound burst travels through the medium to a second point, located a predetermined distance from the first. At the second point, a passive sound reflector, or an active apparatus, produces a returning sound burst. A receiving transducer, positioned close to the transmitting transducer, receives the returned sound. A detection circuit, coupled to the receiving transducer, indicates the presence of the returned sound burst. A timer, with connections to the signal generator and the detection circuit, measures the elapsed time for the round trip of the sound. The resulting time measurement is an indicator of the average temperature along the path between the first and second points. This time measurement is output for use by an electronic system, or processed to represent temperature directly.

18 Claims, 2 Drawing Sheets

ACOUSTIC THERMOMETER

BACKGROUND OF THE INVENTION

1. Field of the Invention

This invention relates to temperature measuring equipment, specifically to an apparatus and method for determining temperature in an open environment by measuring variations in the speed of sound.

2. Description of the Prior Art

The speed of sound within any medium is dependent on the temperature of the medium. Therefore, the time required for sound to traverse a predetermined distance through the medium can be used in determining temperature along the sound's path. This basic principle is common to all relevant prior art, and is the basis of the present invention. However, implementation methods and application areas vary considerably.

Much of the existing art is directed toward fashioning probe-like sensors in which an enclosed sound path is created within a relatively compact apparatus. The enclosed sound path is often defined by a wave guide structure or a solid rod-like device. The wave guide is generally defined by a closed cavity filled with a measurement medium (sometimes air). U.S. Pat. No. 5,123,750 to Ziegler et al. (1992) discloses a cavity guide structure with sound reflecting walls. Rod-like devices generally employ a probe made of a solid material through which sound vibrations are sent. U.S. Pat. No. 3,514,747 to Lynnworth et al. (1970) and U.S. Pat. No. 3,580,076 to Mobsby (1971) are examples of using solid materials as sound guides. In both the cavity guide and solid guide cases, the measurement path is confined within the dimensions of the probe. These closed probe devices measure only the temperature of the probe itself. Such devices are intended for use within unusual environments (i.e. at very high temperatures or in radioactive areas). At normal room temperatures and atmospheric conditions they have no advantage over conventional thermometers.

In U.S. Pat. No. 5,286,109 to Hanscombe et al. (1994) a solid sensor wire probe is used. This probe can be of considerable length; even traversing a building. However, the sound path is still confined within the probe. Measurements through an open area are not possible.

Other existing art devices are directed toward specific applications; as is the case in U.S. Pat. No. 4,848,924 to Nuspl et al. (1989). The apparatus of this patent is designed specifically for the measurement of high temperatures within a noisy environment, such as in a furnace flue. In this case the sound path is not confined to a wave guide. The medium traversed is a gas mixture within the flue. Sound travels from a transmitter located on one side of the flue to a receiver on an opposite side. The transmitter and receiver are wired to a single controller. The sound travels through the medium in only one direction. Movement of the medium (wind) in a direction non-perpendicular to the sound path can create large measurement errors. This severely limits the use of the Nuspl invention in areas where such medium movements can exist.

Conventional, non-acoustic, temperature sensors such as liquid and bimetal thermometers, thermistors, and thermocouples all share the limitation of measuring temperature at a single, confined location. An example where a single measurement point is not desirable is in a thermostatic control for the heating system for a large room; such as an auditorium. Although the desire is to achieve a comfortable temperature throughout the room, the conventional sensor provides the system with temperature information at only one point, usually close to a wall. Additional sensors can be used, but their placement is still only at the room's periphery, and combining their measurements can greatly complicate the system.

A need exists for a temperature measurement apparatus that can provide an average reading of temperature across an open area. The apparatus needs to be sufficiently accurate for its application. Further, it must not be prone to errors induced by environmental factors, such as movement of the measured medium.

SUMMARY OF THE INVENTION

It is a general object of the present invention to provide a thermometer capable of measuring average temperature along a path traversing an open area. The open area being filled with a medium capable of supporting sound waves. An example of such an area is a room of a house. The medium in this case would be air. Another example is a swimming pool, with water being the medium. Rather than measuring temperature at a single point, as is done with conventional thermometers, the present invention would give an average temperature along a path between points in the medium.

The present invention is based on the actuality that the speed of sound is dependent on temperature, and that a measurement of the time required for sound to travel a predetermined distance can be used to determine the speed of sound.

A transducer, capable of converting electrical signals into sound waves within a subject medium, is placed at a first point in the medium. An electrical signal is applied to the transducer generating a burst of sound of a predetermined frequency and duration. The sound, emitted from the transducer, travels through the medium to a second point. The second point is located a predetermined distance from the first. The sound is echoed from the second point back toward the first point. This echo can be produced by passive means (such as a sound reflecting wall) or by active means (such as a repeating apparatus).

A transducer, capable of converting the sound waves into electrical signals and located at the first point, receives the echoed sound. A timer is used to measure the elapsed time for the round trip of the sound. The resulting time measurement is an indicator of the average temperature along the path between the first and second points. This time information can be output as a digital signal or an analog level, for use by an electronic system. The time information can also be processed for output directly representing temperature.

The thermometer of this invention offers great advantages over existing devices when used as a sensor for heating, cooling or other environmental control systems. By providing such systems with temperature information that more accurately represents the environment being controlled, the invention allows the systems to operate with greater efficiency and controllability. Environmental control systems using the present invention can find application in homes, commercial buildings, auditoriums and theaters, refrigerators, freezers, ovens, swimming pools, and almost any other area where temperature control is employed.

The invention offers advantages as a temperature measuring device in other applications as well. These include measurements in environments that are explosive, radioactive, corrosive, or otherwise unsuitable for conventional sensors. The invention also has advantages when used to measure temperature across a path where it is difficult or impossible to locate a conventional sensor.

Further advantages and objects of the invention will become apparent from a consideration of the drawings and ensuing description.

DESCRIPTION OF THE PREFERRED EMBODIMENTS

In this specification "sound" and words relating to sound, are taken to have a scope that includes all mechanical perturbations that are propagated in a wave-type motion at a velocity that is equal to the velocity of sound. This includes, but is not limited to, sound at ultrasonic and audible frequencies.

The term "thermometer" is used throughout this specification to refer generally to a temperature measuring apparatus, and is not limited to a device using a specific structure or technology; nor limited to a device having a self-contained display.

Figure 1:
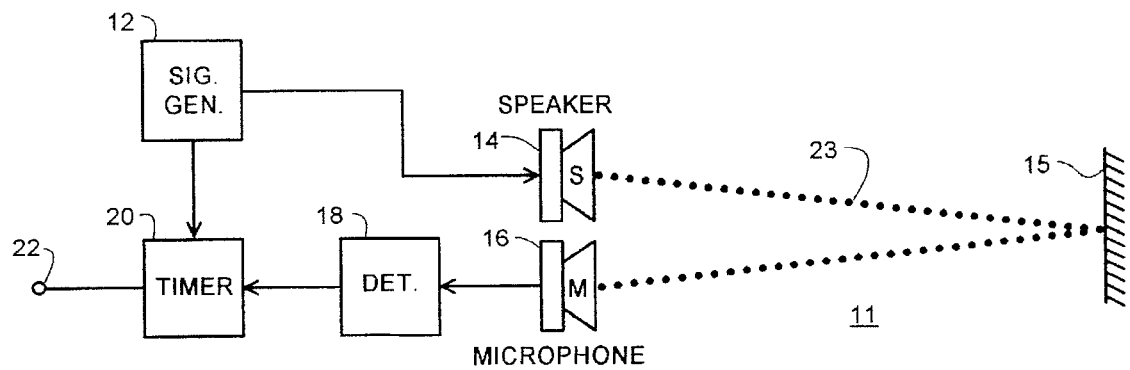
FIG. 1 is a block diagram of a basic embodiment of the invention.

FIG. 1 shows a basic embodiment of the invention. A speaker 14, or a similar transmitting transducer capable of converting an electrical signal at a desired frequency into sound within a desired medium, is electrically connected to a signal generator 12. Signal generator 12 comprises an oscillator and necessary gating and driving circuits to produce a signal burst of a desired duration at a desired frequency. Further, signal generator 12 can repeat the produced signal burst at predetermined intervals. Constructing such a circuit using discrete, astable multivibrator circuits, or microprocessor-based circuits, is common practice in the art.

A microphone 16, or a similar receiving transducer capable of converting sound at a desired frequency in the desired medium into an electrical signal, is connected to a detection circuit 18. Detection circuit 18 provides a digital output indicating the signal's presence. In environments where extraneous noise is not present, detection circuit 18 can be a simple comparator that indicates the presence of any sound. However, in many applications detection circuit 18 will need to amplify and demodulate signals to indicate the presence of a signal at a specific frequency. This avoids false outputs created in noisy environments. Band-pass filters and phase-locked loops are among the common circuits that could be used to construct detection circuit 18.

A timer circuit 20, is connected to signal generator 12 and the output of detection circuit 18. As a minimum, timer circuit 20 is capable of measuring the time elapsed between the start of a signal generated by signal generator 12, and an output from detection circuit 18. Timer circuit 20 also has an output node 22. Information related to the measured elapsed time is available at this node. Output node 22 has one or more conductors, and provides information in analog or digital form for use by circuitry external to the thermometer. Or, the elapsed time information can be further processed and presented in a visual format.

In this specific embodiment, ultrasonic sound at a frequency of 40 KHz is used. The medium used is air at normal atmospheric temperatures and pressures. Examples of system components are given for these conditions. It should be noted that these examples are used to aid in clearly describing the embodiment, and are not to be taken as limitations on the scope of the invention.

For a frequency of 40 KHz, speaker 14 is an ultrasonic transmitter and microphone 16 is an ultrasonic receiver. These ultrasonic elements are widely used in remote control applications, and are usually tuned devices working within a narrow frequency band. This narrow bandwidth aids in the reduction of unwanted noise signals.

Detection circuit 18 is available commercially for 40 KHz operation. Detection circuits used in both ultrasonic and infrared remote control systems can be used with little or no modification. A typical circuit integrates an amplifier, limiter, band pass filter, demodulator, integrator, and comparator into a single assembly. Their wide use in television remote controls make these circuits inexpensive and readily available.

Still referring to FIG. 1, operation of the invention is now described. A signal burst is generated by signal generator 12. For example, the burst could consist of 100 cycles at 40 KHz. This signal burst is supplied to speaker 14. An indication of the presence of the signal burst is supplied to timer circuit 20; starting the elapsed time measurement. The signal burst is converted into sound by speaker 14. The sound travels out of speaker 14 and through a medium 11 along a sound path 23 reaching a sound reflective surface 15. Sound reflective surface 15 is located within medium 11, at a predetermined distance from speaker 14. The sound is reflected back toward its source. Microphone 16 is located near, and is oriented in the same direction as, speaker 14. Microphone 16 receives the reflected sound, converts it to an electrical signal, and passes the signal on to detection circuit 18. Upon detecting the presence of the returned signal, having the same frequency and duration as the transmitted sound burst, detection circuit 18 sends an indication to timer circuit 20; stopping the elapsed time measurement.

The elapsed time, as measured by timer circuit 20, equals the time required for sound to travel from speaker 14 to reflective surface 15 and back to microphone 16, plus any time delay produced within the circuit elements. The magnitude of any circuitry-produced time delay is of no consequence provided that the delay is consistent. The delay can be subtracted from the total elapsed time, producing a true time-of-flight value for the sound.

The time-of-flight value and the total distance traveled by the sound are used to determine the speed of the sound from the formula:

$$c = d/t$$

where c is the speed, d is the total distance traveled, and t is the time required to travel the distance. The speed of sound through a medium is dependent on the temperature of that medium. For air, at normal atmospheric pressures and normal room temperatures, the temperature is approximated by the equation:

$$T = (c/49)^2 - 460$$

where T is the temperature (in degrees Fahrenheit) and c is the speed of sound (in feet per second).

Timer circuit 20 presents information related to temperature at output node 22. This information can include the raw elapsed time, the corrected time-of-flight value, the calculated speed of sound, and the temperature. Any, or all, of the above information can be presented depending on the circuitry used for timer circuit 20.

Relative to their distance to the reflective surface, speaker 14 and microphone 16 are located close to each other. Thus, the transmitted sound and reflected sound traverse effectively the same path; but in opposite directions. This is important in reducing errors caused by movement of the medium. Since sound is a wave traveling in a medium, movements of the medium result in a change in the speed of sound, as measured by a sensor that is stationary. If wind is moving the air along the path of the sound, a significant error is produced if the speaker and microphone are located at opposite ends of the path. However, by having the sound return along the same path the effects of the air movement are canceled.

For example, if a wind of speed x is blowing in a direction from speaker 14 to the reflecting surface, the speed of sound along the interconnecting path is increased by speed x. But, sound making the return trip (from the reflecting surface to microphone 16) is traveling against the wind; its speed is decreased by speed x. Since the distance traveled with the wind equals the distance traveled against the wind, the net effect of the wind is zero.

Figure 4:
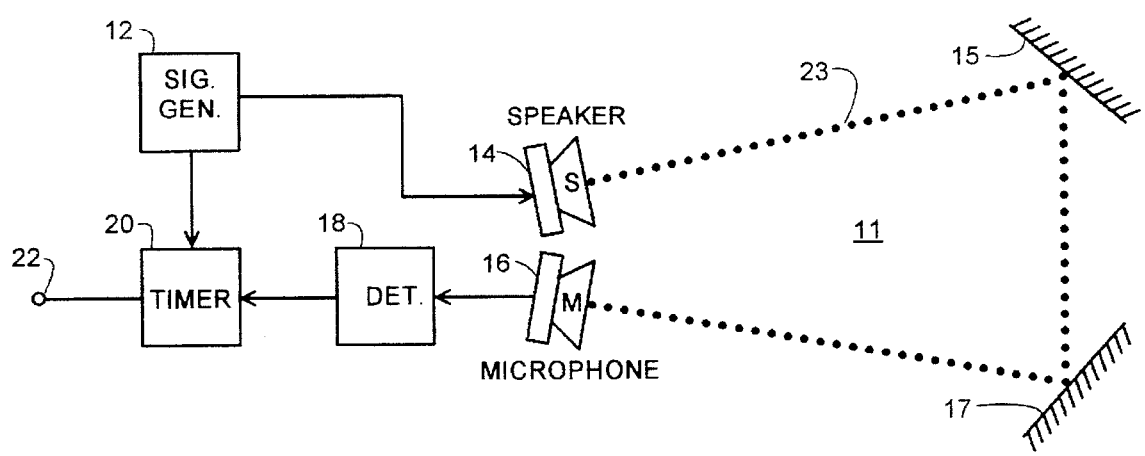
FIG. 4 is a block diagram of an additional embodiment of the invention having two sound reflective surfaces.

Although the above example uses only one reflective surface, a similar canceling of wind errors is accomplished whenever the sound path forms a closed loop. The sound could be reflected off other surfaces (such as a second sound reflective surface 17 in FIG. 4, forming a triangular arrangement for example) and still achieve wind error correction; provided that the wind is uniform and the complete sound path starts and ends at the same point.

Figure 2:
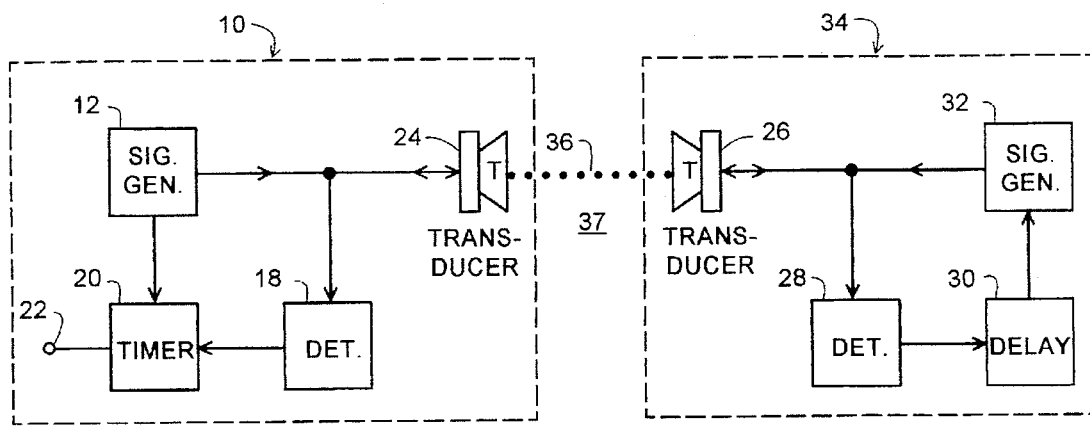
FIG. 2 is a block diagram of an additional embodiment of the invention, which includes an active echo apparatus.

Since it is advantageous to have the transmitting transducer (speaker 14) and the receiving transducer (microphone 16) located close to each other, combining their functions into a single unit is desirable. Referring to FIG. 2, a single transducer 24 converts electrical signals into sound and also converts sound into electrical signals. For ultrasonic frequencies such dual function devices are common. Transducer 24 in FIG. 2 replaces speaker 14 and microphone 16 of FIG. 1. Circuitry functionally equivalent to that shown in FIG. 1, comprises a main unit 10, shown in FIG. 2. Transducer 24 is connected to both signal generator 12 and detection circuit 18. Operation of main unit 10 is the similar to that of the circuit of FIG. 1, previously described.

For the configuration of FIG. 2, it is important that the duration of the generated sound burst be shorter than the minimum time required for the sound to travel its complete path. This is necessary to prevent the returning sound from reaching transducer 24 before the transmission of the sound is complete. Additionally, timer circuit 20 must ignore inputs from detection circuit 18 for the duration of the sound burst. The connection from signal generator 12 provides the required information to timer circuit 20.

FIG. 2 also depicts an active echo unit 34 that acts as a repeating apparatus to receive a sound and return a sound. Echo unit 34 is comprised of: a second transducer 26, a second detection circuit 28, a delay circuit 30, and a second signal generator 32. Second transducer 26 and second detection circuit 28 are equivalent in construction and operation to transducer 24 and detection circuit 18, respectively. Delay circuit 30 provides a predetermined and consistent delay of a digital signal. Second signal generator 32 generates a signal burst similar to signal generator 12, but production of the burst is triggered by an external digital input. Second transducer 26 is connected to second detection circuit 28 and second signal generator 32. Delay circuit 30 is connected between the output of second detection circuit 28 and the trigger input of second signal generator 32.

In operation, active echo unit 34 provides a similar function to that of the sound reflective surface described above. An incoming sound burst, at a predetermined frequency, is received by second transducer 26, transformed into an electrical signal, and conveyed to second detection circuit 28. Upon detection of the signal, second detection circuit 28 provides a digital signal to delay circuit 30. After delaying the digital signal for predetermined time period (a period greater than the duration of the sound burst) delay circuit 30 conveys the digital signal to second signal generator 32. Second signal generator 32 generates a responding signal burst of a predetermined duration at a predetermined frequency. The responding signal burst is applied to second transducer 26, and is converted into sound. The responding sound burst may be identical in frequency and duration to the incoming sound burst, but need not be so. Using a responding sound burst that differs from the incoming burst can be useful in reducing undesired echoes.

In FIG. 2 a sound path 36, through a medium 37, connects main unit 10 to active echo unit 34. It is important to note that this is the only required connection between the units.

Within the scope of the present invention, either a passive method (such as reflective surface 15) or an active method (such as echo unit 34) can be used to return sound. The choice is largely application dependent. While passive methods provide simplicity, active methods provide longer range and greater noise immunity.

Figure 3:
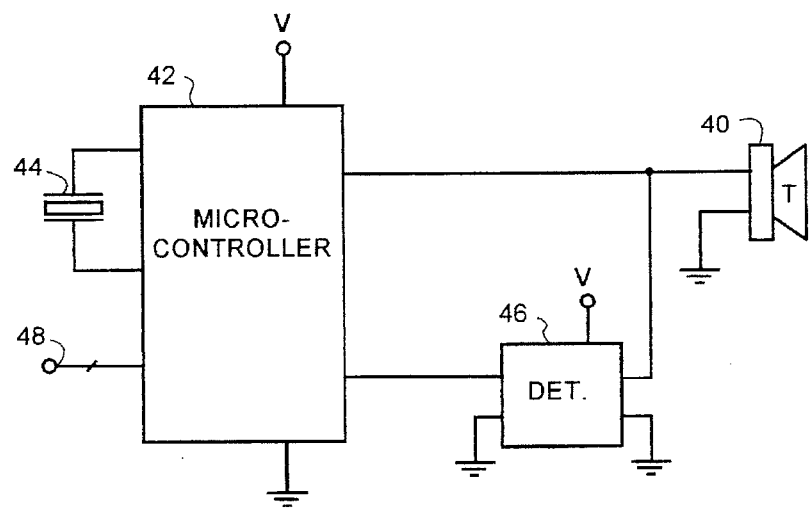
FIG. 3 is a schematic diagram of a specific embodiment of the invention.

The schematic diagram of FIG. 3 illustrates an embodiment applying computing circuitry. The following description refers to references in FIGS. 1 and 2 as well as FIG. 3. A programmable, microprocessor-based circuit, such as a single-chip microcontroller 42, having inputs and outputs, is coupled to a timing regulator 44. Timing regulator 44, can consist of a quartz crystal, a ceramic resonator, a clock oscillator, or any other element capable of providing microcontroller 42 with a time reference of sufficient resolution and accuracy for the application. An output of microcontroller 42 is connected to a sound transducer 40. Sound transducer 40 is equivalent to transducer 24; previously described. Sound transducer 40 is connected to a detector 46, which in turn is connected to an input of microcontroller 42. Detector 46 performs the same function as detection circuit 18; previously described. Additionally, microcontroller 42 has an interface connection 48, which provides the same functionality as output node 22.

The functions of signal generator 12 and timer circuit 20 are combined within microcontroller 42. Microcontroller 42 is programmed, using methods well known in the art, to perform the following operations. A signal burst of a predetermined duration at a predetermined frequency is produced at the output connected to sound transducer 40. A timing operation within microcontroller 42 is started. Beginning some time after the completion of the signal burst, the input connected to detector 46 is continuously monitored. Upon receipt of an appropriate indication from detector 46, the timing operation is stopped. The result of the timing operation is an elapsed time value that is related to the desired temperature measurement. At this point the elapsed time value can be presented at interface connection 48. Additionally, microcontroller 42 can perform computations on the elapsed time value to determine a time-of-flight value, a speed-of-sound value, and a temperature value; any, or all, of which can be presented at interface connection 48. Interface connection 48 can also be used to provide control signals for ancillary equipment (furnace relays, ventilation controls, and the like) when measured temperatures reach predetermined limits.

The circuit of FIG. 3 can, of course, be used with either the passive or the active sound reflecting methods previously described. It should also be noted that a circuit very similar to that of FIG. 3 can be used to implement active echo unit 34 of FIG. 2. To accomplish this, the interface connection is eliminated and the functions of delay circuit 30 and second signal generator 32 are performed by an appropriately programmed microcontroller.

Up to this point, descriptions of the sound burst employed by the thermometer have been limited to a single burst at a single frequency. In environments subject to interference, an embodiment in which the signal generator produces a modulated signal burst resulting in a modulated sound burst can be advantageous. To illustrate a possible modulation technique, assume that the signal burst (and thereby the transmitted sound burst) is turned on and off producing a digital pattern (say binary code 1011). The sound burst will thereby convey an identity code. The received and detected echo of the sound is tested for the same digital pattern (again binary code 1011). If the patterns do not match, it is likely that noise or other factor has interfered with the measurement. In this case the measurement can be discarded and a new measurement initiated. When an active repeating apparatus is used to return the sound, different code patterns can be used for the out going and the returning sound. This can reduce the effects of unwanted echoes. Averaging multiple measurements is another technique that can improve performance in some applications. These techniques can be quite easily implemented using software programmable components, such as microcontroller 42 in FIG. 3.

The described embodiments have detailed the thermometer of the invention. The thermometer utilizes the temperature dependence of the speed of sound to measure average temperature along a path through a medium. The path is not confined within an enclosing structure of the thermometer; but is free to traverse an open environment. Further, a bidirectional sound path is used to reduce errors that can be induced by movements of the medium.

While the above description contains many specific details, these should not be construed as limitations on the scope of the invention, but only as examples used in the preferred embodiments of the invention. Many other variations are possible. For example: separate speakers and microphones can be replaced by single transducers, and vice versa; circuitry for providing the required functions can vary; functions can be combined into single circuits or split between circuits; and the medium and sound frequencies can be other than described. Accordingly, the scope of the invention should not be determined by the embodiments illustrated, but by the appended claims and their legal equivalents.

I claim:

1. A thermometer for measuring average temperature based on measurement of the time required for sound to traverse a path of predetermined length through an open environment, the environment being composed of a medium capable of supporting the propagation of sound waves, the measured time being an indicator of the average temperature of the medium along the path of the sound, the thermometer comprising:

means for generating an electrical signal burst of predetermined frequency and duration, and for modualting the signal burst to convey an identity code;

a sound transmitting transducer for converting the electrical signal burst into a sound burst, the sound burst having substantially the same frequency and duration as the electrical signal burst and conveying the identity code, the transmitting transducer being connected to the generating means and positioned to transmit the sound burst along the path through the medium;

a sound receiving transducer for receiving a reflection of the sound burst and converting the reflected sound burst into a received electrical signal, the reflection being returned from a predetermined distance on the path, the receiving transducer being positioned proximate to the transmitting transducer, means for detecting the presence of the received electrical signal having the identity code, the detecting means having an input connected to the sound receiving transducer and having an output for indicating the presence of the received electrical signal; and a timer, connected to the generating means and to the output of the detecting means, for measuring elapsed time between the generation of the electrical signal and the indication of the detection of the received electrical signal having the identity code, the timer further having an output connection for communicating information related to the elapsed time measurement.

2. The thermometer of claim 1 wherein the function of the sound transmitting transducer and the function of the sound receiving transducer are performed by a single transducer, the single transducer being able to convert electrical signals into sound and further being able to convert sound into electrical signals.

3. The thermometer of claim 1 wherein the detecting means indicates the presence of the received electrical signal only if the received electrical signal has substantially the same frequency and duration as the transmitted sound burst.

4. The thermometer of claim 1 wherein the timer subtracts a predetermined circuitry-produced delay value from the elapsed time measurement to produce a corrected time-of-flight value at the timer output connection.

5. A thermometer for measuring average temperature based on measurement of the time required for sound to traverse a path of predetermined length through an open environment, the environment being composed of a medium capable of supporting the propagation of sound waves, the measured time being an indicator of the average temperature of the medium along the path of the sound, the thermometer comprising:

means for generating an electrical signal burst of predetermined frequency and duration, and for modulating the signal burst to convey an identity code;

a sound transmitting transducer for converting the electrical signal burst into a sound burst, the sound burst having substantially the same frequency and duration as the electrical signal burst and conveying the identity code, the transmitting transducer being connected to the generating means and positioned to transmit the sound bursts along the path through the medium;

means for returning the sound burst, located in the path at predetermined distance from, and returning the sound burst substantially toward, the transmitting transducer;

a sound receiving transducer for receiving and converting the returned sound burst into a received electrical signal, the receiving transducer being positioned proximate to the transmitting transducer;

means for detecting the presence of the received electrical signal having the identity code, the detecting means having an input connected to the sound receiving transducer and having an output for indicating the presence of the received electrical signal; and a timer, connected to the generating means and to the output of the detecting means, for measuring elapsed time between the generation of the electrical signal burst and the indication of the detection of the received electrical signal having the identity code, the timer further having an output connection for communicating information related to the elapsed time measurement.

6. The thermometer of claim 5 wherein the function of the sound transmitting transducer and the function of the sound receiving transducer are performed by a single transducer, the single transducer being able to convert electrical signals into sound and further being able to convert sound into electrical signals.

7. The thermometer of claim 5 wherein the detecting means indicates the presence of the received electrical signal only if the received electrical signal has substantially the same frequency and duration as the transmitted sound burst.

8. The thermometer of claim 5 wherein the timer subtracts a predetermined circuitry-produced delay value from the elapsed time measurement to produce a corrected time-of-flight value at the timer output connection.

9. The thermometer of claim 5 wherein the sound burst returning means is a single sound-reflective surface positioned in the medium such that the sound burst and the returned sound burst propagate in opposite directions along substantially the same sound path.

10. The thermometer of claim 5 wherein the sound burst returning means comprises at least two sound-reflective surfaces positioned within the medium so as to form the sound path into a multi-segmented loop beginning at the sound transmitting transducer and ending at the sound receiving transducer.

11. The thermometer of claim 5 wherein the sound burst returning means comprises an active repeating apparatus comprising:

a second sound receiving transducer for receiving the sound burst and converting it into a received electrical signal of the repeating apparatus;

second means for detecting the presence of the received electrical signal of the repeating apparatus, the second detecting means having an input connected to the second receiving transducer and an output for indicating the presence of the received electrical signal of the repeating apparatus;

means for delaying the output of the second detecting means for a predetermined time at least equal to the duration of the sound burst, the delaying means being connected to the output of the second detecting means;

second means for generating an electrical signal burst of the repeating apparatus of predetermined frequency and duration in response to the delayed output of the second detecting means; and a second sound transmitting transducer for converting the electrical signal burst of the repeating apparatus into the returning sound burst within the medium, the second transmitting transducer being coupled to the second generating means.

12. The thermometer of claim 11 wherein the function of the second sound transmitting transducer and the function of the second sound receiving transducer are performed by a single transducer of the repeating apparatus, the single transducer of the repeating apparatus being able to convert sound into electrical signals and further being able to convert electrical signals into sound.

13. The thermometer of claim 11 wherein the second detecting means indicates the presence of the received electrical signal of the repeating apparatus only if the received electrical signal of the repeating thermometer has substantially the same frequency and duration as the transmitted sound burst.

14. The thermometer of claim 11 wherein the second generating means modulates the signal burst supplied to the second transmitting transducer resulting in a modulated sound burst conveying an identity code.

15. The thermometer of claim 11 wherein the sound burst returning means is a single instance of the repeating apparatus positioned in the medium such that the sound burst and the returned sound burst propagate in opposite directions along substantially the same sound path.

16. The thermometer of claim 11 wherein the sound burst returning means comprises at least two instances of the repeating apparatus positioned within the medium so as to form the sound path into a multi-segmented loop beginning at the sound transmitting transducer and ending at the sound receiving transducer.

17. A method for measuring average temperature based on measurement of the time required for sound to traverse a path of predetermined length through an open environment, the environment being composed of a medium capable of supporting the propagation of sound waves, the measured time being an indicator of average temperature of the medium along the path of the sound, the method comprising the steps of:

generating an electrical signal burst of predetermined frequency and duration;

modulating the electrical signal burst to convey an identity code;

converting the electrical signal burst into a sound burst having substantially the same frequency and duration and transmitting the sound burst along the path through the medium;

returning the sound burst from a predetermined distance on the path;

receiving the returned sound burst and converting it into a received electrical signal;

detecting the presence of the received electrical signal;

identifying the presence of the identity code within the received electrical signal;

measuring the elapsed time the generation of electrical signal burst and the detection of the received electrical signal having the identity code; and providing information related to the elapsed time measurement to an output connection wherein said information corresponds to average temperature.

18. The method of claim 17 wherein the returning of the sound burst further comprises the steps of:

receiving the sound burst and converting it into a second received electrical signal;

detecting the presence of the second received electrical signal and providing an indication of such;

delaying the indication for a predetermined amount of time at least equal to the duration of the sound burst;

generating a second electrical signal burst of predetermined frequency and duration in response to the delayed indication; and converting the second electrical signal burst into the returning sound burst.

\* \* \* \* \*